United States Patent
Alizadeh et al.

(10) Patent No.: US 12,471,052 B2
(45) Date of Patent: Nov. 11, 2025

(54) LOCATION ACCURACY VIA INTELLIGENT REFLECTING SURFACES

(71) Applicant: Cisco Technology, Inc., San Jose, CA (US)

(72) Inventors: Ardalan Alizadeh, Milpitas, CA (US); Sivadeep R. Kalavakuru, Milpitas, CA (US); Matthew Aaron Silverman, Shaker Heights, OH (US); John Matthew Swartz, Lithia, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 395 days.

(21) Appl. No.: 17/989,313

(22) Filed: Nov. 17, 2022

(65) Prior Publication Data

US 2024/0172163 A1    May 23, 2024

(51) Int. Cl.
*H04W 64/00*     (2009.01)
*H04L 1/1607*    (2023.01)
*H04W 4/02*      (2018.01)

(52) U.S. Cl.
CPC ........... *H04W 64/00* (2013.01); *H04L 1/1607* (2013.01)

(58) Field of Classification Search
CPC ....... H04W 64/00; H04W 4/029; H04W 4/02; H04W 4/025; H04W 4/023; H04W 4/021; H04W 4/38; H04W 4/50; H04W 48/04; H04W 48/20; H04W 8/00; H04W 88/02; H04W 88/08; H04L 1/1607; H04L 1/12; H04L 1/14; H04L 1/16; H01Q 3/14; H01Q 3/16; H01Q 3/18; H01Q 3/20; H01Q 3/24; H01Q 15/00; H01Q 15/0006; H01Q 15/0013; H01Q 15/14; H01Q 15/23;
(Continued)

(56) References Cited

U.S. PATENT DOCUMENTS 10,412,643 B1 * 9/2019 Liu et al. .......... H04W 36/0088
10,764,900 B1 * 9/2020 Gopalakfishnan et al. ................. H04W 72/048
12,015,459 B2 * 6/2024 Wang et al. ......... H04B 7/0456
(Continued)

FOREIGN PATENT DOCUMENTS

CN     110839204 A    2/2020
CN     111245494 A    6/2020
(Continued)

OTHER PUBLICATIONS (CN 112260739 A) Information Transmission Method Based on Intelligent Reflecting Surface For Beam Forming (see title) (Year: 2021).*
(Continued)

*Primary Examiner* — Khawar Iqbal
(74) *Attorney, Agent, or Firm* — Edell, Shapiro & Finnan, LLC

(57) ABSTRACT

In some aspects, the techniques described herein relate to a method including: determining a series of predetermined phases for wireless signals to be used in location calculations for a station device accessing a wireless access point; reflecting wireless signals from the wireless access point off of an intelligent reflecting surface to the station device; and controlling the intelligent reflecting surface such that a series of the wireless signals are reflected off of the intelligent reflecting surface with the predetermined phases.

20 Claims, 6 Drawing Sheets

(58) Field of Classification Search
CPC .......... H01Q 19/10; H01Q 9/175; H01Q 9/18; H01Q 9/185

See application file for complete search history.

(56) References Cited

U.S. PATENT DOCUMENTS

| | | | |
|---|---|---|---|
| 12,063,087 B2* | 8/2024 | Sun | H04B 7/04013 |
| 2007/0143816 A1* | 6/2007 | Gupta et al. | 725/135 |
| 2010/0229216 A1* | 9/2010 | Koga | 726/3 |
| 2022/0416933 A1* | 12/2022 | Nam et al. | H04L 1/0003 |
| 2023/0089054 A1* | 3/2023 | Gurelli | G01S 5/0273 342/378 |
| 2023/0176174 A1* | 6/2023 | Penna | H01Q 3/46 342/451 |
| 2023/0189021 A1 | 6/2023 | Ali et al. | |
| 2023/0208479 A1* | 6/2023 | Wang | H04B 7/0617 375/262 |
| 2023/0246674 A1 | 8/2023 | Åström et al. | |
| 2023/0266457 A1* | 8/2023 | Gurelli | G01S 13/876 342/125 |
| 2023/0361826 A1* | 11/2023 | Khan | H04B 17/328 |
| 2023/0413354 A1* | 12/2023 | Zaev | H04W 72/53 |
| 2024/0168153 A1* | 5/2024 | Gurelli | H01Q 15/148 |
| 2024/0337722 A1* | 10/2024 | Shrivastava | G01S 5/0289 |
| 2025/0055507 A1* | 2/2025 | Wang | H04B 7/026 |
| 2025/0062808 A1* | 2/2025 | Wang | H04W 52/0235 |

FOREIGN PATENT DOCUMENTS

| | | | |
|---|---|---|---|
| CN | 111818533 A | 10/2020 | |
| CN | 114727318 A | 7/2022 | |
| EP | 4007193 A1 * | 6/2022 | H04L 1/0007 |

OTHER PUBLICATIONS (VN 10025025 B), Device and Method of Wireless Communication (see title) (Year: 2020).*

Bourdoux, et al., "6G White Paper on Localization and Sensing," https://arxiv.org/abs/2006.01779, Jun. 3, 2020, 38 pages.

Wu, et al., "Intelligent Reflecting Surface Enhanced Wireless Network via Joint Active and Passive Beamforming," https://arxiv.org/abs/1810.03961, Aug. 12, 2019, 35 pages.

Zhao, "A Survey of Intelligent Reflecting Surfaces (IRSs): Towards 6G Wireless Communication Networks," https://arxiv.org/pdf/1907.04789.pdf, Nov. 2, 2019, 7 pages.

Mishra, et al., "Channel Estimation and Low-Complexity Beamforming Design for Passive Intelligent Surface Assisted MISO Wireless Energy Transfer," https://sigport.org/sites/default/files/docs/Poster_PIS_WET_ICASSP19.pdf, Apr. 16, 2019, 1 page.

Tang, et al., "Wireless Communications with Reconfigurable Intelligent Surface: Path Loss Modeling and Experimental Measurement," https://arxiv.org/pdf/1911.05326.pdf, Sep. 14, 2020, 32 pages.

Yuan, et al., "Reconfigurable-Intelligent-Surface Empowered Wireless Communications: Challenges and Opportunities," https://arxiv.org/pdf/1911.05326.pdf, Aug. 17, 2020, 7 pages.

Qi, "Wireless Geolocation in a Non-line-of-sight Environment," https://cs.gmu.edu/~iyoun/geo/pdf/qi_thesis.pdf, Nov. 2003, 142 pages.

Dunna M., et al., "ScatterMIMO: Enabling Virtual MIMO with Smart Surfaces," https://wcsng.ucsd.edu/files/scattermimo.pdf, published Apr. 17, 2020, 14 pages.

* cited by examiner

LOCATION ACCURACY VIA INTELLIGENT REFLECTING SURFACES

TECHNICAL FIELD

The present disclosure relates to wireless networks.

BACKGROUND

Intelligent reflecting surfaces (IRSs) have recently attracted attention for use in cellular networks, and in particular, 6G cellular networks. An IRS is a surface that includes a large number of elements each being able to reflect the incident signal independently with adjustable characteristics. Some IRSs utilize low cost, passive phase shifters which allow the IRS to collaboratively achieve three-dimensional (3D) passive beamforming without the need of any transmit radio-frequency (RF) chains. IRSs have been tested in walls that would otherwise absorb/reflect some portion of the signal's transmit power. In literature, several names have been considered for these smart reflectors, including large intelligent surfaces (LIS), large intelligent metasurfaces (LIM), smart reflect-arrays, reconfigurable intelligent surfaces, software-defined surfaces (SDS), and passive intelligent surfaces (PIS).

DETAILED DESCRIPTION

Overview

In some aspects, the techniques described herein relate to a method including: determining a series of predetermined phases for wireless signals to be used in location calculations for a station device accessing a wireless access point; reflecting wireless signals from the wireless access point off of an intelligent reflecting surface to the station device; and controlling the intelligent reflecting surface such that a series of the wireless signals are reflected off of the intelligent reflecting surface with the predetermined phases.

In some aspects, the techniques described herein relate to a method including: obtaining, at a station device, a first wireless signal provided from a wireless access point along a path that includes an intelligent reflecting surface; obtaining, at the station device, a second wireless signal provided from the wireless access point along the path that includes the intelligent reflecting surface, wherein the second wireless signal is phase shifted relative to the first wireless signal by the intelligent reflecting surface according to a series of predetermined orthogonal phase vectors; and determining a location of the station device relative to the wireless access point based upon the first wireless signal and the second wireless signal.

In some aspects, the techniques described herein relate to an apparatus including: at least one intelligent reflecting surface; and one or more processors, wherein the one or more processors are configured to: determine a series of predetermined phases for wireless signals to be used in location calculations for a station device accessing a wireless access point; and control the at least one intelligent reflecting surface such that a series of wireless signals, incident from a wireless access point, are reflected off of the at least one intelligent reflecting surface to the station device with the predetermined phases.

Example Embodiments

Figure 1:
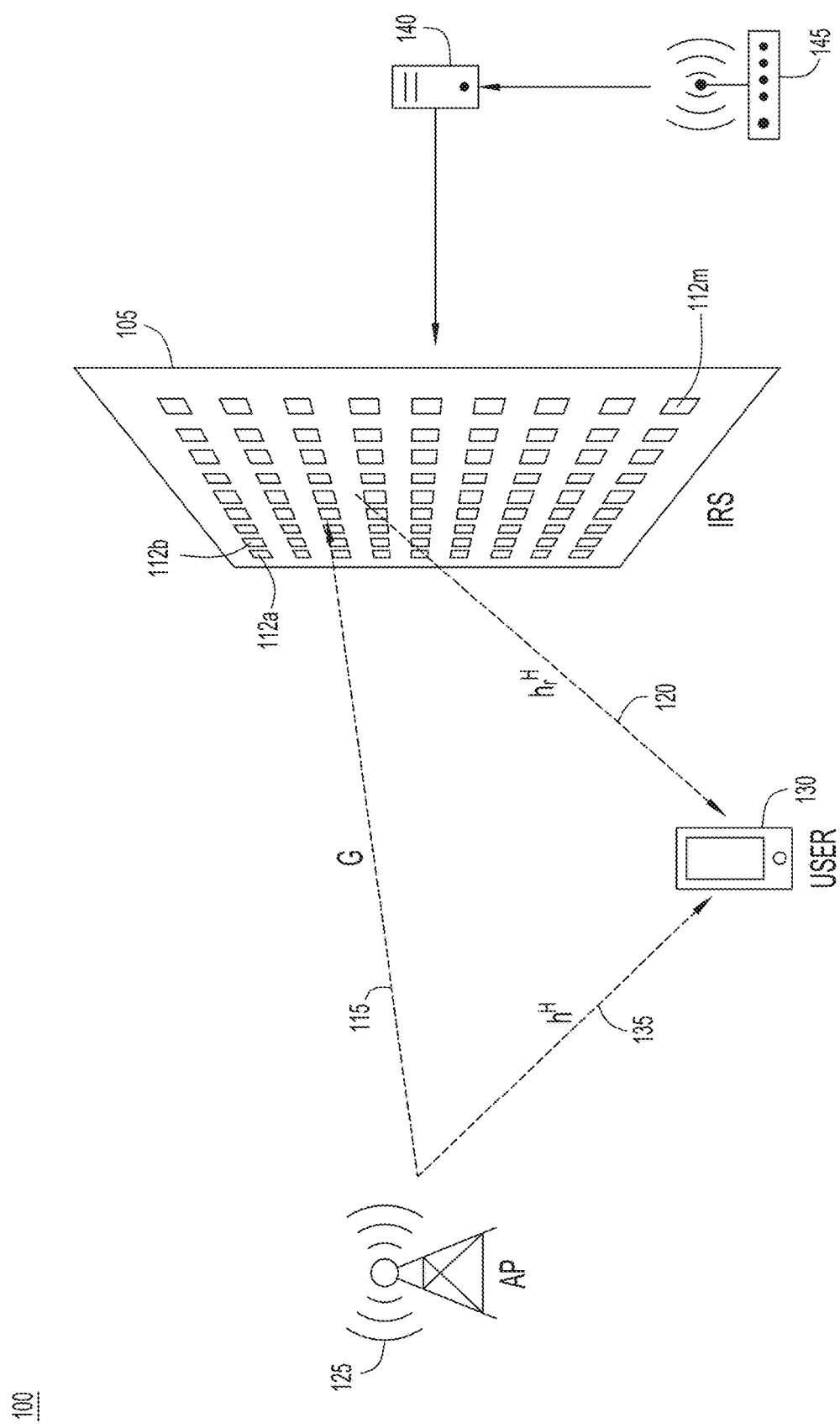
FIG. 1 illustrates a network environment configured to implement the location calculation techniques of this disclosure, according to an example embodiment.

With reference made to FIG. 1, depicted therein is a system 100 configured to implement the techniques of this disclosure. Included in system 100 are a wireless access point 125, a wireless station, embodied as user equipment 130, and an intelligent reflecting surface (IRS) 105. According to specific example embodiments, the wireless access point provides 125 a wireless local area network (WLAN), such as a Wi-Fi network, including a Wi-Fi 8 or later network. As understood by the skilled artisan, a station refers to a device that is capable of transmission and reception of data via a network, and an access point is a device that creates a network, such as a WLAN. An intelligent reflecting surface refers to a reflective surface that tunes wireless environments to increase spectrum and energy efficiencies using an array of independently controllable elements.

The controllable elements of IRS 105 are embodied as an array of "passive" units 112a-m, each of which can independently incur some change to the incident signal 115. The incurred change may be a change to the phase, amplitude, frequency, or even polarization of the signal. For example, reflected signal 120 may exhibit a phase shift relative to that of incident signal 115. According to such embodiments, IRS 105 introduces the change in incident signal 115 without substantially consuming transmit power.

According to the disclosed techniques, IRS 105 is leveraged to intelligently configure system 100 to assist the transmissions between the sender (in this case access point 125) and receiver (in this case user equipment 130), when direct communications exhibit degraded or detrimental qualities. Example placements for IRS 105 may include walls, building facades, and ceilings. IRS technologies have been discussed as candidate technologies for use in 6G cellular networks. However, IRSs have, up until now, not been considered for use in WLANs, such as the wireless network illustrated in system 100.

The techniques disclosed herein utilize IRSs to generate wireless signals that are better tailored for use in station-to-access point location calculations. According to some of the disclosed techniques, IRS 105 is used to alter the phase of wireless signals incident from access point 125 such that the reflected signals obtained by user equipment 130 are statistically structured to provide for accurate location calculations. According to other techniques, particularly when channel state information (CSI) is known by the device controlling the IRS, IRS 105 may be controlled such that signals incident on IRS 105 are directed away from user equipment 130, ensuring user equipment 130 performs location calculations using only direct channel signals. More specific descriptions of these techniques are provided below. Accordingly, the disclosed techniques use IRSs to create a dynamic multipath environment in order to isolate the LOS path or filter out multipath impact on location estimates.

By way of background, location calculations may be performed according to a variety of techniques, including calculations based on time of flight (ToF) techniques, direction of arrival (DoA) techniques, angle of approach or angle of attack (AoA) techniques, received signal strength indicator (RSSI) techniques, and/or fine time measurement (FTM) techniques.

The RSSI approach is the most commonly used indoor localization method due to its generally adequate performance and the omnipresence of wireless communication systems, making the deployment of dedicated hardware for localization unnecessary.

AoA techniques, implemented on some access points, capture the CSI across a number of antennas. This information is used to compare the observed CSI by each antenna against reference values and deduce the relative position of the client to the access point. The direction finding is based on a multiple signal classification (MUSIC) algorithm and the accuracy of the AoA estimation will be low when there are large multipaths.

FTM is a point-to-point (P2P), single-user protocol, which includes an exchange of multiple message frames between an initiating WLAN station (ISTA) and a responding STA (RSTA). The initiating STA attempts to measure its range with regard to the responding station (e.g., WLAN access point or a dedicated FTM responder). The baseband detection of the main component is rendered more difficult with multipath, especially when the time delays of reflected paths are short.

Localization accuracy is often impaired by Non-Line-Of-Sight (NLOS) connections and indoor multipath effects. For example, in current designs of fast-locate systems (e.g., RSSI-based designs), every access point scans the entire channels during off-channel dwell times which will be provided by dedicated auxiliary radios or serving radios. All access points need to have direct reception with very low multipath reflections otherwise the RSSI measurements of different APs will be biased based on the attenuated energy because of NLOS paths.

Unfortunately, indoor locationing systems are often susceptible to indoor multipath effects such as reflections, scattering, diffraction, refraction, and absorption, especially in NLOS conditions when shadowing occurs. In ToF and DoA systems, these changes of the propagation path result in erroneous measurements. In RSSI based locationing, the multipath effects lead to fluctuations of the signal strength, complicating localization efforts. However, the techniques disclosed herein leverage the capabilities of IRSs, such as IRS 105, to perform location calculations that may address location error due to multipath effects.

As illustrated in FIG. 1, access point 125 transmits signals to user equipment 130. These signals include direct line of sight signal 135 and a reflected signal that includes incident signal 115 and reflected signal 120. IRS 105 reflects incident signal 115 towards user equipment 130 as reflected signal 120. IRS 105 includes M number of passive units 112a-m, which are embodied as phase-shifters. The phase shifters 112a-m are configurable and programmable via IRS controller 140.

The baseband model of the signals received at user equipment 130 may be written as:

$$y = (h_r^H \times P \times G \times h^H)x + n \quad (1).$$

To simplify the model, a single antenna transmitter and receiver are assumed, which results in the following values in equation 1: $h_r$ is a vector of size M×1 and denotes the reflected signal 120 from IRS 105 to the user equipment 130; P is a vector of size M×M and denotes the phase matrix of IRS 105; and P is a diagonal matrix with the form of:

$$\begin{bmatrix} e^{jp_1} & 0 & \cdots & 0 \\ 0 & e^{jp_2} & 0 & 0 \\ \vdots & \vdots & \ddots & \vdots \\ 0 & 0 & \cdots & e^{jp_m} \end{bmatrix}; \quad (2)$$

where $p_i$ is the phase shift of i-th reflecting element of IRS 105 and j is the unit imaginary number. The channel vector from the access point 125 to IRS 105 is denoted by G with size M×1. The line of sight signal 135 to user equipment 130 is denoted $h^H$ and x is the transmitted symbol with noise n.

The techniques disclosed herein provide a method to improve the location accuracy in an environment with a large reflection when the channel state information of the reflective path is not available. In other words, described below are techniques for determining locations in an environment with a large reflection when $h_r$ and G are not known. To achieve this, the phase values $e^{jp_i}$ of the matrix P are selected from a set of orthogonal vectors.

A subset $\{v_i, \ldots, v_k\}$ of a vector space V, with the inner product $\langle \ \rangle$, is called orthogonal if $\langle v_i, v_j \rangle = 0$, when $i \neq j$. That is, the vectors are mutually perpendicular. According to the disclosed techniques, such an orthogonal basis is determined for the phase vector P, equation 2 above. One obvious orthonormal basis of vector size M is to just simply consider $a_i = [0, 0, \ldots, 1, \ldots, 0, 0]$ where the i-th element is 1 and the rest are zeros. However, for location calculations of this example, this basis will not provide the effective reflection over only one phase shifter. Therefore, the following procedure may be used to find the phase states.

In the first step, a random phase vector of size M is generated:

$$[p_1, p_2, \ldots p_M] \quad (3);$$

where $-\pi \leq p_i \leq \pi$.

Next, Gram-Schmidt Orthonormalization without normalization is performed, ensuring that the orthonormalization completely spans the entire space of the phase rotation. In other words, if the process begins with a basis of $\{p_i\}$, the Gram-Schmidt Orthonormalization algorithm fixes a first vector $u_1 = p_1$, and then the second vector can be constructed, without normalizing $u_1$, as:

$$u_2 = p_2 - u_1 \langle u_1, p_2 \rangle / |u_1|^2 \quad (4);$$

where <•,•> is the inner product. This vector may then be used for the successive steps of the process, without normalizing it to obtain a set of orthogonal vectors $u_i$, where each vector $u_i$ refers to one IRS state. Once determined, the vectors $u_i$ may be used to control IRS 105 to provide for improved location calculations between access point 125 and user equipment 130. Specifically, because the reflected signals 120 obtained by user equipment 130 are obtained with orthogonal phases, the above described NLOS effects (e.g., fluctuations of the signal strength in RSSI techniques, changes of the propagation path in ToF and DoA techniques) may be accounted for in the location calculations performed by user equipment 130. For example, the reflected signals 120 obtained by the user equipment 130 may be configured to be substantially different, e.g., as different as possible, such that the signals undergo different constructive/destructive combining that facilitates more accurate distance calculations.

According to a first example, units 112a-m of IRS 105 are periodically changed at specified time intervals according to the vectors $u_i$. Accordingly, the phase pattern of IRS 105 changes periodically in specified time intervals. For example, a standalone timer may be used, in response to which IRS controller 140 switches the state of units 112a-m at predetermined time intervals. This example may represent a simple solution that relies on optimization of the specified time interval.

According to another example, IRS controller 140 switches the state of units 112a-m of IRS 105 based upon the beacon interval of access point 125. A low-end wireless receiver 145 connected to the IRS 105 may be used to provide the beacon interval information to IRS controller 140. Switching IRS 105 based upon the beacon interval may allow IRS 105 to adapt itself based on the network configuration.

The periodic phase changes, whether provided at a specified interval or based upon the beacon interval, provide better location accuracy after combining multiple estimates with different reflection beams. The states are pre-determined based on the orthogonal basis of the phases $u_i$. Accordingly, and as noted above, the phase changes may result in reflected signals that are substantially different, thereby facilitating improved distance calculations.

As understood by the skilled artisan, the changing of the IRS state may slightly change the channel state information. If very short time intervals are selected (in the range of a few microseconds, such as 10 ms), the sounded channel will be outdated before the coherence time of the channel. Therefore, a minimum limit for the interval should be considered and the IRS period cannot be less than this minimum.

Figure 2:
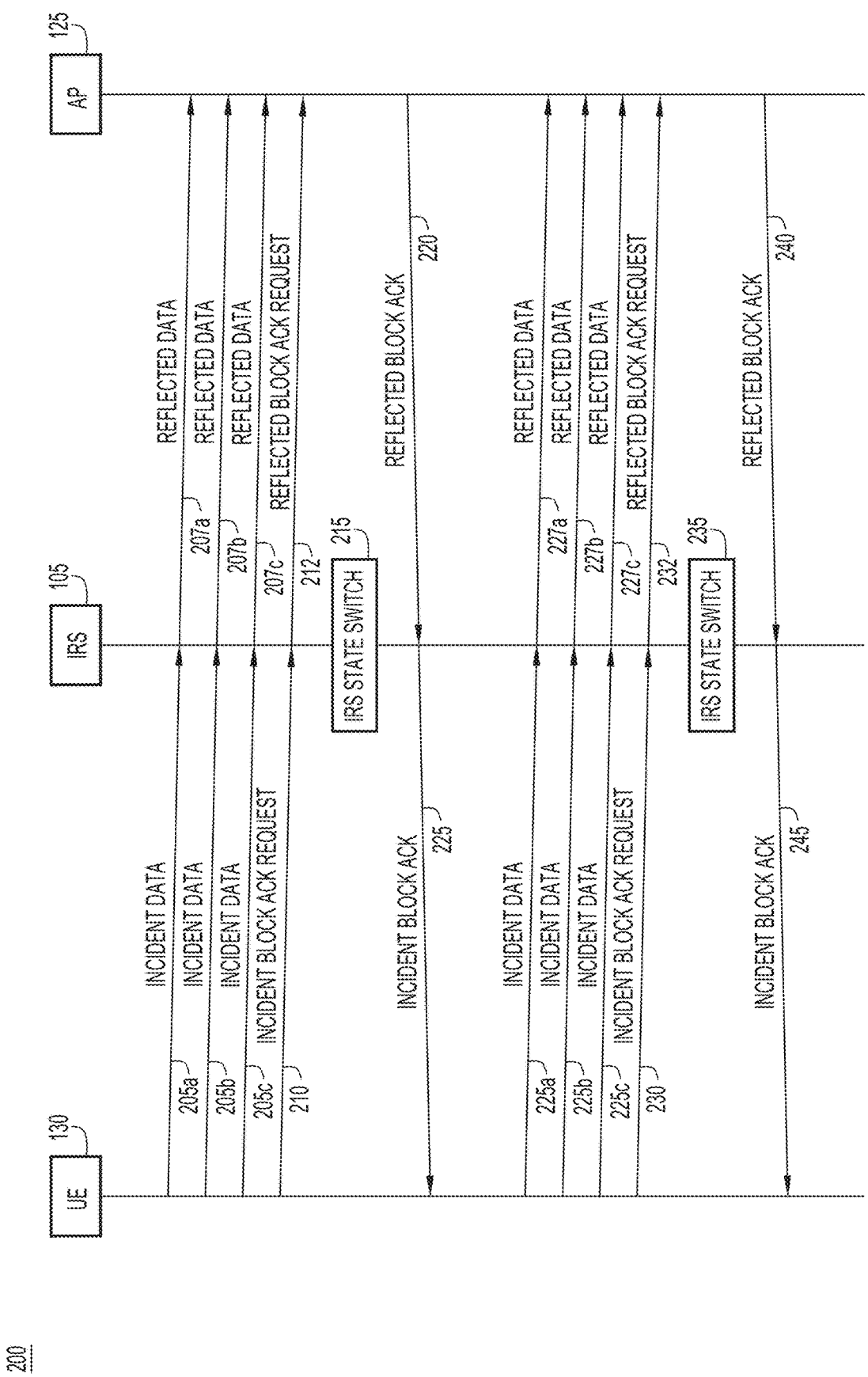
FIG. 2 is a call flow diagram illustrating a process for implementing the location calculation techniques of this disclosure in conjunction with block acknowledgment techniques, according to an example embodiment.

With reference now made to FIG. 2, depicted therein is a call flow diagram 200 in which the disclosed techniques are applied on a per block-acknowledgment-request/block-acknowledgment (BAR/BA) transmission time basis. As will be described with reference to FIG. 2, the state of IRS 105 is switched between a block acknowledgement request message (also referred to as a "blockack request") transmitted from a sender and the block acknowledgment message (also referred to as a "blockack") sent in response by the receiver. The state of IRS 105 will remain idle or unchanged during other times, such as during the data transmissions between the sender and receiver.

By way of background, block acknowledgment is a technique utilized in certain communication protocols, such as Wi-Fi and protocols defined in the Institute of Electrical and Electronics Engineers (IEEE) 802.11 technical standard, that increases throughput by decreasing protocol overhead. Instead of individually acknowledging each received packet, a single block acknowledgment frame can acknowledge multiple packets. This reduces the number of acknowledgement frames and corresponding interframe spaces, thereby increasing throughput. For example, in FIG. 2 data is transmitted between user equipment 130 and access point 125 in the form of data blocks 205a-c/207a-c and 225a-c/227a-c. More specifically, user equipment 130 transmits incident data blocks 205a-c which are incident on IRS 105 and reflected to access point 125 as reflected data blocks 207a-c. Access point 125 does not acknowledge each of data blocks 207a-c individually. Instead, user equipment 130 provides incident block acknowledgment request 210 which is incident on IRS 105 and reflected to user equipment 130 as reflected block acknowledgment request 212. User equipment 130 acknowledges receipt of all of reflected data blocks 207a-c by providing incident block acknowledgment 220 in response to obtaining reflected block acknowledgment request 212. Incident block acknowledgment 220 is reflected by IRS 105 as reflected block acknowledgment 225, which is obtained by user equipment 130.

According to the techniques disclosed herein, IRS 105 determines from the content of incident block acknowledgment request 210 that a BAR/BA transmission is taking place. For example, a low-end wireless receiver connected to the IRS 105, such as wireless receiver 145 of FIG. 1, may obtain incident block acknowledgment request 210. IRS 105 may then be controlled to change its state in operation 215 so that incident block acknowledgment 220 is reflected back to user equipment 130 with a different phase than the previously reflected messages. For example, the state of IRS 105 may be controlled such that it introduces a phase shift corresponding to a next orthogonal phase shift indicated in the vectors $u_i$ discussed above with reference to FIG. 1.

This process will repeat as illustrated through incident data blocks 225a-c, reflected data blocks 227a-c, incident block acknowledgment request 230, reflected block acknowledgment request 232, incident block acknowledgment 240 and reflected block acknowledgment 245. Specifically, based upon the content of incident block acknowledgment request 230, the state of IRS 105 is changed in operation 235 to that of the next vector $u_i$ in between the reflection of reflected block acknowledgment request 232 and the incidence of incident block acknowledgment 240. This process may repeat for a series of BAR/BA transmission blocks, providing user equipment 130 with a series of signals with orthogonal phases, allowing user equipment 130 to implement the improved location calculation techniques of this disclosure.

Implementing the disclosed techniques on a per BAR/BA transmission block basis as described with reference to FIG. 2 may require a fast switching speed of the IRS phase shifters. Specifically, the state of IRS 105 may need to be switched with sufficient speed that its state will have changed between reflecting incident block acknowledgment requests 210/230 and the incidence of incident block acknowledgments 220/240. Additionally, implementing the disclosed techniques on a per BAR/BA transmission block basis may provide higher diversity compared with the periodic state change techniques described with reference to FIG. 1. Implementing the disclosed techniques on a per BAR/BA transmission block basis may also be effective for AoA-based locationing.

In addition to the above-described implementation, the techniques disclosed herein may be implemented in other ways. For example, the techniques may be implemented during off-channel scans by an access point.

For a wireless client, off-channel scanning refers to when a wireless client device, such as user equipment 130, tunes its radio to another channel to look for available access points or scans for access points on a channel to which it is not connected (hence "off-channel"). The client scans the off-channel access points looking for a suitable access point to connect to in case it needs to roam from its current "on-channel" access point. An access point may also perform off-channel scanning. This process is the same as off-channel scanning for wireless client devices and essentially allows the access point to tune its radio to a different channel for a finite amount of time. Off-channel scanning is typically used as a method to detect sources of interference, rogue or unauthorized ad-hoc wireless networks. The operation of performing off-channel scanning is highly dependent in terms of manufacturer implementation and configuration of the WLAN.

When implemented through off-channel scanning, the techniques of this disclosure may be implemented by controlling an IRS, such as IRS 105 of FIG. 1, such that its state cycles through orthogonal phases, such as phases $u_i$, during the off channel scans performed by an access point, such as access point 125 of FIG. 1. According to such examples, a feedback mechanism may be provided between the access point that is closest to the IRS and the IRS. This feedback mechanism allows the IRS to change its state during off-channel scans. Accordingly, the serving channel or "on channel" will not change because the IRS state remains the same throughout on-channel communications. Changes to the IRS state during off-channel scanning may provide better location estimates on average for a certain client or user equipment device.

Figure 3:
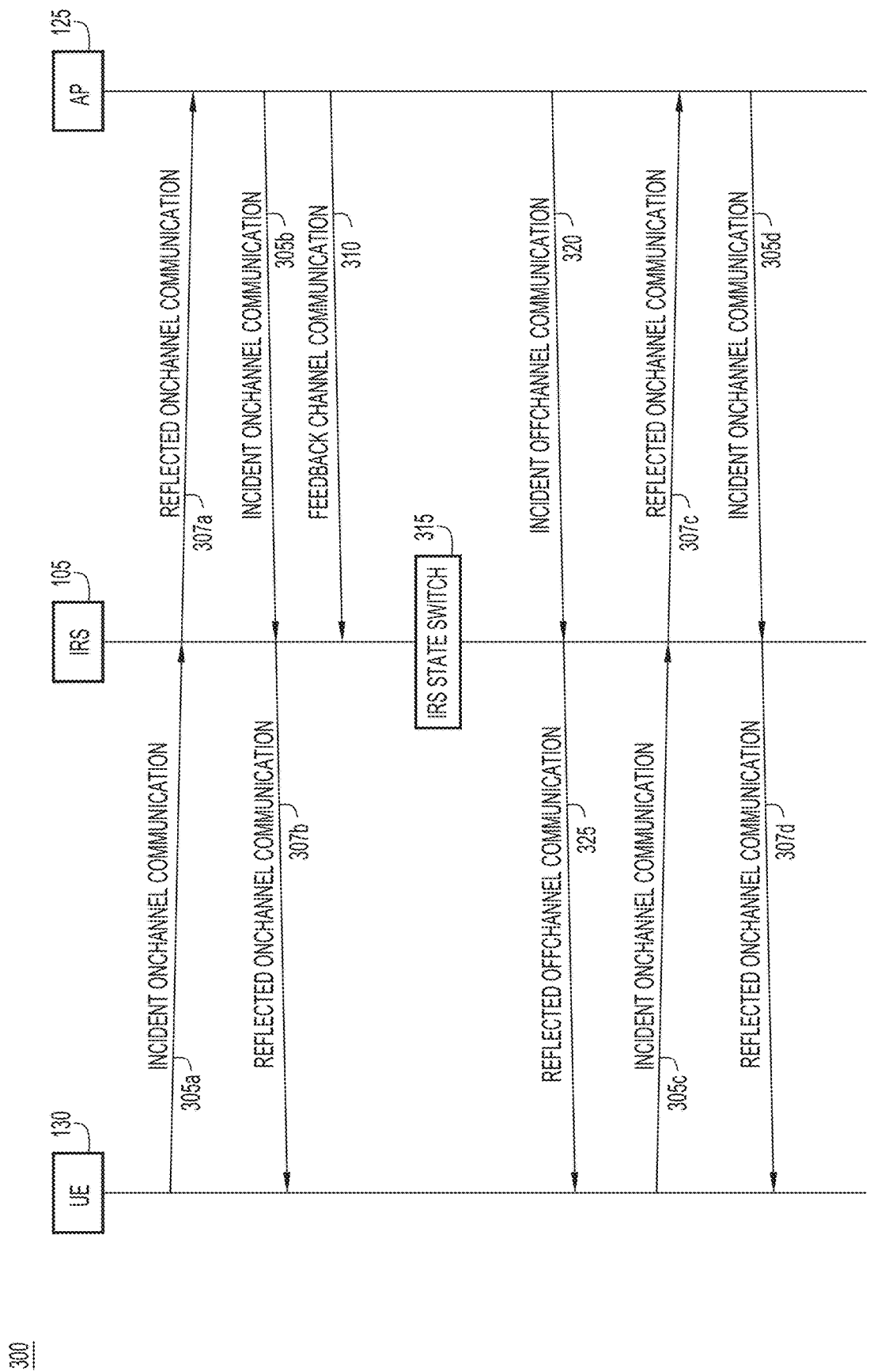
FIG. 3 is a call flow diagram illustrating a process for implementing the location calculation techniques of this disclosure in conjunction with off-channel scanning techniques, according to an example embodiment.

With reference now made to FIG. 3, depicted therein is a call flow diagram 300 illustrating communications in which the disclosed techniques are applied during off-channel scanning by access point 125. Call flow diagram 300 begins with on-channel communications between user equipment 130 and access point 125. These communications include incident on-channel communications 305*a* and 305*b* which are reflected off of IRS 105 as reflected on-channel communications 307*a* and 307*b*. At an appropriate time, access point 125 provides feedback channel communication 310 to IRS 105 indicating to IRS 105 that access point 125 will be entering an off-channel scan. According to call flow diagram 300, feedback channel communication 310 is embodied as a separate communication between access point 125 and IRS 105. However, other embodiments may embed such communications within on-channel communications, such as incident on-channel communication 305*b*. Regardless of the specific message, IRS 105 may receive an indication that access point 125 will be entering an off-channel scan via a wireless receiver connected to an IRS controller, such as wireless receiver 145 and IRS controller 140 of FIG. 1.

In response to obtaining the indication that access point 125 will be entering an off-channel scan, IRS 105 is controlled such that its state changes in operation 315. For example, the state of IRS 105 may change from one phase of $u_i$ to the next phase in the series determined as described above with reference to FIG. 1. Accordingly, when incident off-channel communication 320 is reflected from IRS 105, reflected off-channel communication 325 will be orthogonally phase shifted relative to, for example, reflected on-channel communication 307*b*. Based on this orthogonal phase shift, user equipment 130 may perform more accurate location calculations. As indicated in incident on-channel communications 305*c* and 305*d* and reflected on-channel communications 307*c* and 307*d*, access point 125 and user equipment 130 return to on-channel operation. The process illustrated in call flow diagram 300 may repeat so that IRS 105 changes its state to cycle through the orthogonal phase shifts $u_i$ over a series of successive off-channel scans.

The examples discussed above may be implemented by the IRS even when the CSI is not available to the IRS. In other words, the techniques may be implemented when $h_r$ and G from equation 1 above are not known. However, the techniques of this disclosure are not limited to embodiments where $h_r$ and G are not known. As discussed below, when the CSI is known, this information may be leveraged by the disclosed techniques to provide improved location calculations.

As mentioned, each phase shifter of the IRS may be embodied as a simple and low cost passive patch with no radio frequency (RF) chain. Therefore, the CSI for every element of vectors $h_r$ and G may not be readily available. However, as understood by the skilled artisan, there are methods of CSI estimation which use three states of the IRS and estimate the channel three times to identify the parameters of a reflected path. Discussed below are two examples of the disclosed techniques where such CSI knowledge is leveraged to improve user equipment location calculations.

In ToF-based methods, the mitigation of reflected signals is performed by tracking the peak of channel impulse response (CIR). Generally, techniques leveraging peak CIR assume that the peak channel response is representative of the direct path. However, there is a possibility that the highest power in CIR comes from reflected paths, such as a Ricean channel or implementations impaired with NLOS paths.

By taking the knowledge of the CSI from reflected paths into account, steps can be taken to eliminate reflected paths from the signals used to perform the location calculations. Such methods include the following operations:

1. First, the latency of the peak value is compared against the latency of a reflected path. If the time latencies are close or the peak comes later, it means that the direct link is missing.
2. Second, the reflective path may be removed from combined CSI. Removing the reflective path from the CIS improves location calculations where high bandwidth is not available and the CIR resolution is low.

According to other examples where CSI is available, the above-described matrix P in equation 1 may be determined such that it minimizes the $h_r^H \times P \times G$ term in equation 1. By finding the matrix P that nullifies the impact of reflected paths, more accurate location estimates may be achieved.

Figure 4:
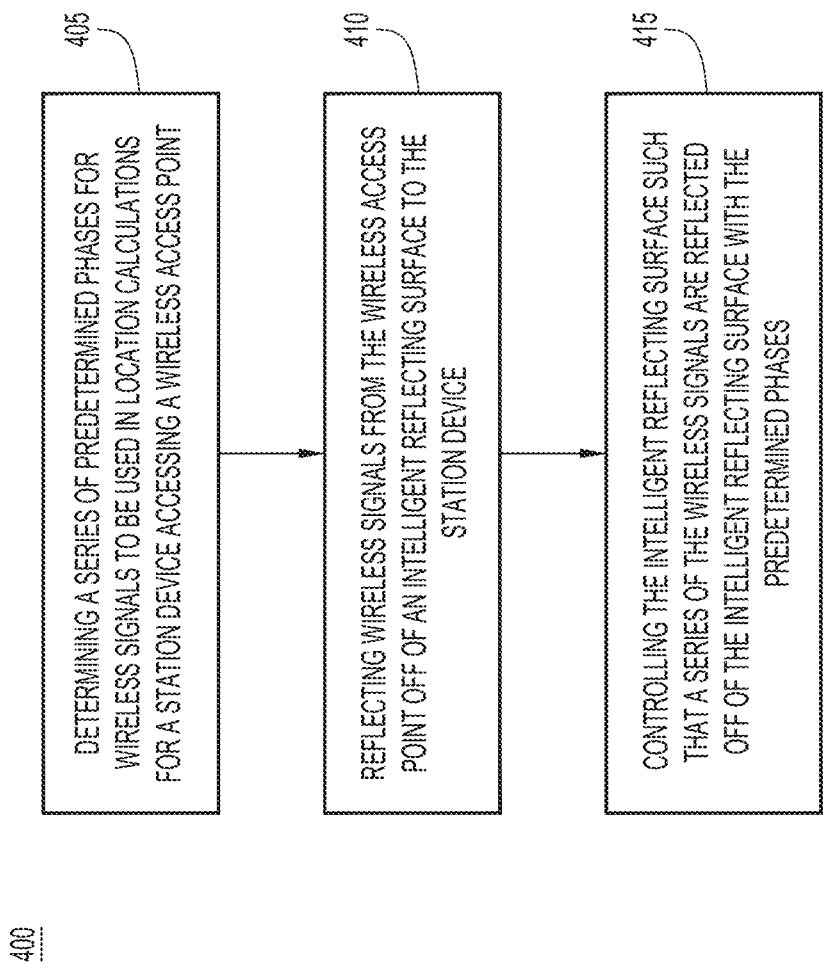
FIG. 4 is a flowchart illustrating a process flow that may be carried out at an intelligent reflecting surface to implement the location calculation techniques of this disclosure, according to an example embodiment.

With reference now made to FIG. 4, depicted therein is flowchart 400 providing a generalized process for implementing the techniques disclosed herein, and in particular, the techniques discussed with respect to FIGS. 1-3. Specific embodiments of flowchart 400 may be carried out as operations of an intelligent reflecting surface (which may or may not include an intelligent reflecting surface controller and/or a wireless receiver) as illustrated in FIG. 1.

Flowchart 400 begins in operation 405 where a series of predetermined phases are determined for wireless signals to be used in location calculations for a station device accessing a wireless accession point. Accordingly, operation 405 may be embodied as the determination of the phase vectors $u_i$ described above with reference to FIG. 1.

In operation 410, wireless signals provided by a wireless access point are reflected off of an intelligent reflecting surface. The reflected signals are provided to the station device. Accordingly, operation 410 may be embodied as the reflection of wireless signals by IRS 105 of FIG. 1.

Finally, in operation 415, the intelligent reflecting surface is controlled such that a series of the wireless signals are reflected off of the intelligent reflecting surface with the predetermined phases. Accordingly, operation 415 may be embodied as the controlling of the state changes of IRS 105 as described above with reference to FIGS. 1-3.

Figure 5:
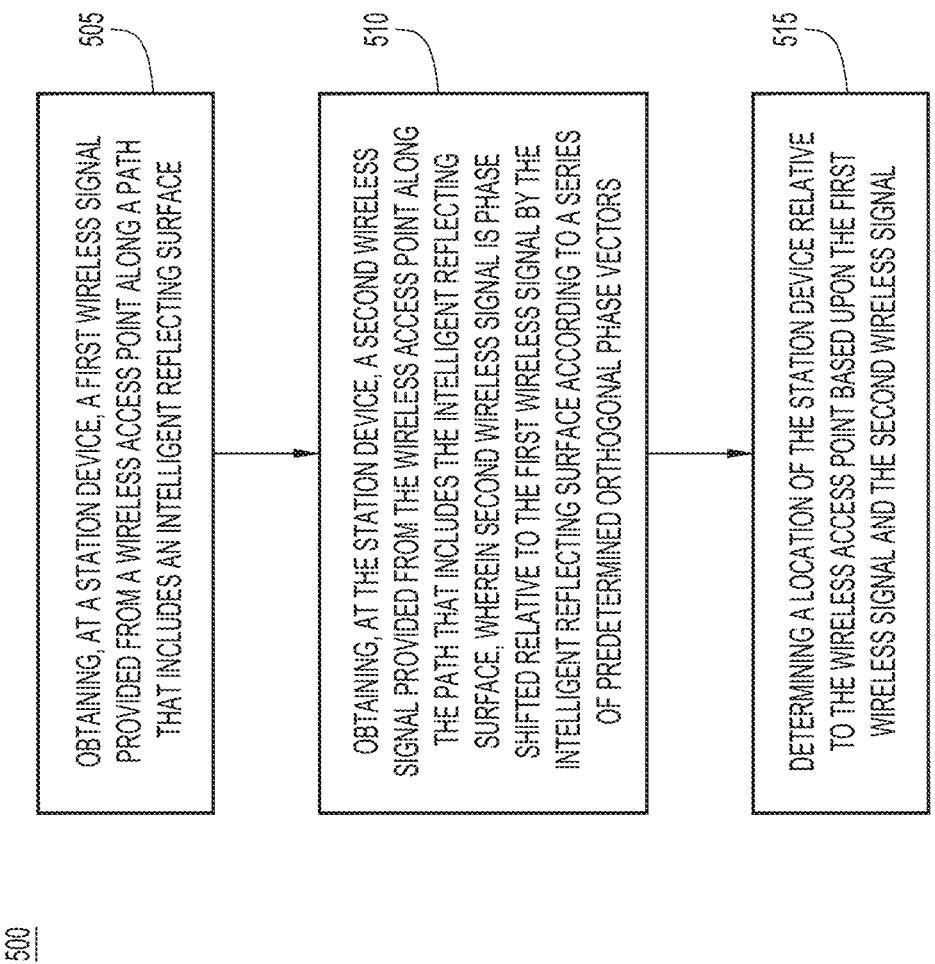
FIG. 5 is a flowchart illustrating a process flow that may be carried out at a wireless station to implement the location calculation techniques of this disclosure, according to an example embodiment.

With reference now made to FIG. 5, depicted therein is a flowchart 500 providing a generalized process for implementing the techniques disclosed herein, and in particular, the operations performed by a station device, such as user equipment 130 as described above with reference to FIGS. 1-3.

Flowchart 500 begins in operation 505 where a first wireless signal is obtained at a station device. The first wireless signal is provided from a wireless access point along a path that includes an intelligent reflecting surface. Accordingly, operation 505 may be embodied as user equipment 130 obtaining a signal reflected from IRS 105 of FIGS. 1-3.

Next, in operation 510, the station device obtains a second wireless signal provided from the wireless access point along the path that includes the intelligent reflecting surface. The second wireless signal is phase shifted relative to the first wireless signal by the intelligent reflecting surface according to a series of predetermined orthogonal phase vectors. Accordingly, operation 510 may be embodied as user equipment 130 receiving a second wireless signal after a state change of IRS 105, as described with reference to FIGS. 1-3. For example, the second wireless signal may be obtained by the station device after a predetermined interval, as described with reference to FIG. 1, after a state change of IRS 105 in response to a block acknowledgement request message, as described with reference to FIG. 2, or in response to an access point entering an off-channel scan operation, as described with reference to FIG. 3.

Finally, in operation 515, the station device determines a location relative to the wireless access point based upon the first wireless signal and the second wireless signal.

Figure 6:
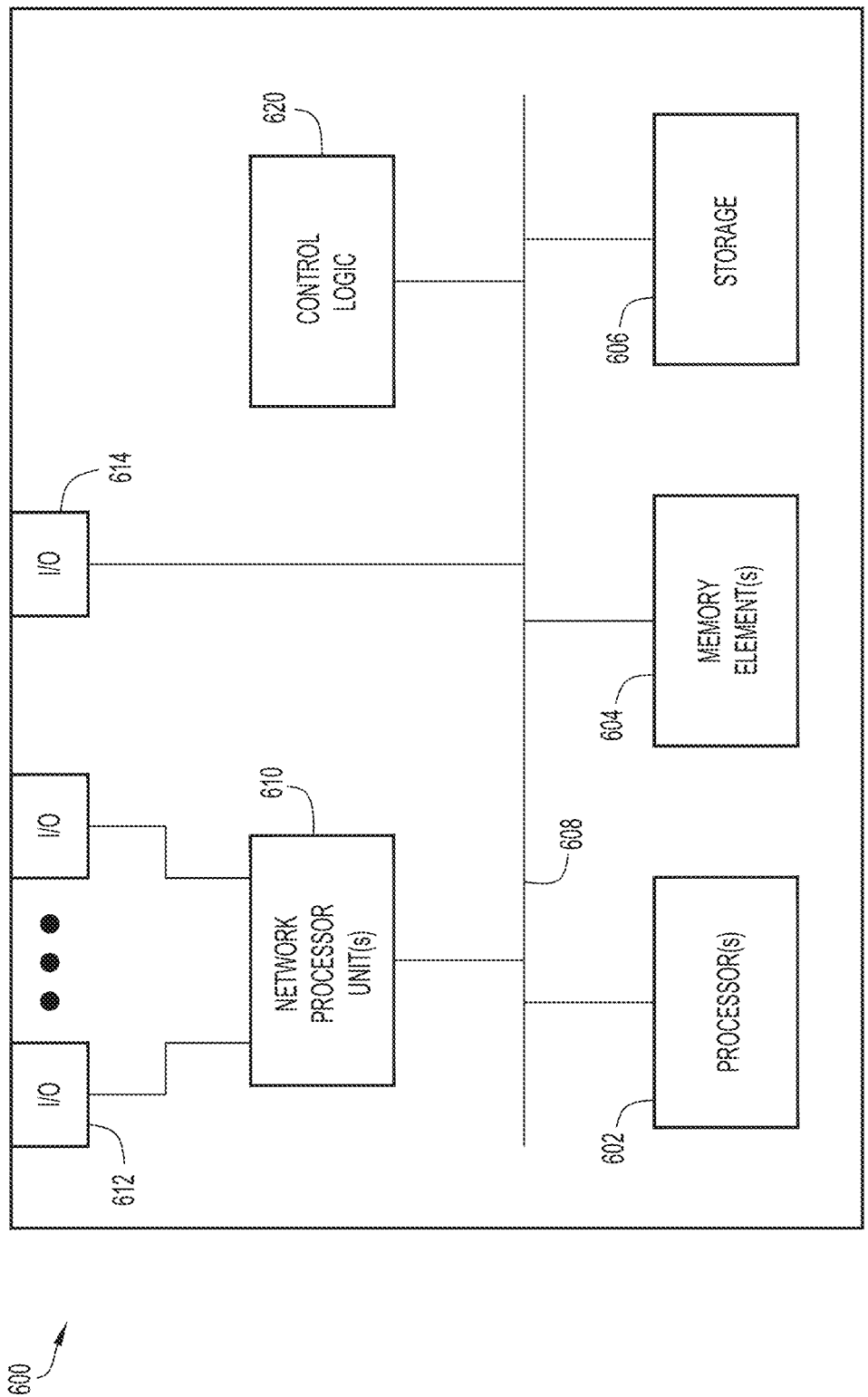
FIG. 6 illustrates a hardware block diagram of a computing device configured to implement the location calculation techniques of this disclosure, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device or apparatus, such as computing device 600 or any combination of computing devices 600, may be configured as any entity/entities as discussed for the techniques depicted in connection with FIGS. 1-5 in order to perform operations of the various techniques discussed herein.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity, and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source, and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques disclosed herein are related to using IRSs to create a dynamic multipath environment in order to isolate the LOS path or filter out multipath impact on location estimate. According to some aspects, the techniques described herein relate to a method including: determining a series of predetermined phases for wireless signals to be used in location calculations for a station device accessing a wireless access point; reflecting wireless signals from the wireless access point off of an intelligent reflecting surface to the station device; and controlling the intelligent reflecting surface such that a series of the wireless signals are reflected off of the intelligent reflecting surface with the predetermined phases.

In some aspects, the techniques described herein relate to a method, wherein determining the predetermined phases includes determining a series of orthogonal phase vectors.

In some aspects, the techniques described herein relate to a method, wherein determining the series of orthogonal phase vectors includes determining the series of orthogonal phase vectors using a Gram-Schmidt Orthonormalization algorithm.

In some aspects, the techniques described herein relate to a method, wherein the intelligent reflecting surface is controlled such that the wireless signals reflected off of the intelligent reflecting surface transition from one phase of the predetermined phases to a next phase of the predetermined phases in response to detecting a specific message transmitted between the wireless access point and the station device.

In some aspects, the techniques described herein relate to a method, wherein the specific message includes a block-acknowledgment request message.

In some aspects, the techniques described herein relate to a method, wherein controlling the intelligent reflecting surface includes controlling the intelligent reflecting surface in response to the wireless access point entering an off-channel scanning operation.

In some aspects, the techniques described herein relate to a method, wherein controlling the intelligent reflecting surface includes controlling the intelligent reflecting surface based on channel state information for communications between the wireless access point and the station device.

In some aspects, the techniques described herein relate to a method, wherein controlling the intelligent reflecting surface based on the channel state information includes controlling the intelligent reflecting surface to eliminate reflected paths from the wireless signals obtained by the station device.

In some aspects, the techniques described herein relate to a method, wherein controlling the intelligent reflecting surface includes controlling the intelligent reflecting surface such that the intelligent reflecting surface provides the series of the wireless signals with the predetermined phases at a predetermined interval.

In some aspects, the techniques described herein relate to a method, wherein the predetermined interval is based upon a beacon interval of the wireless access point.

In some aspects, the techniques described herein relate to a method including: obtaining, at a station device, a first wireless signal provided from a wireless access point along a path that includes an intelligent reflecting surface; obtaining, at the station device, a second wireless signal provided from the wireless access point along the path that includes the intelligent reflecting surface, wherein the second wireless signal is phase shifted relative to the first wireless signal by the intelligent reflecting surface according to a series of predetermined orthogonal phase vectors; and determining a location of the station device relative to the wireless access point based upon the first wireless signal and the second wireless signal.

In some aspects, the techniques described herein relate to a method, wherein the first wireless signal is obtained during a first off-channel scanning operation of the wireless access point and the second wireless signal is obtained during a second off-channel scanning operation of the wireless access point.

In some aspects, the techniques described herein relate to a method, wherein obtaining the second wireless signal includes obtaining the second wireless signal in response to a block-acknowledgment request message provided from the station device to the wireless access point.

In some aspects, the techniques described herein relate to a method, wherein the second wireless signal includes a block acknowledgment message provided by the wireless access point in response to the block-acknowledgment request message.

In some aspects, the techniques described herein relate to an apparatus including: at least one intelligent reflecting surface; and one or more processors, wherein the one or more processors are configured to: determine a series of predetermined phases for wireless signals to be used in location calculations for a station device accessing a wireless access point; and control the at least one intelligent reflecting surface such that a series of wireless signals, incident from a wireless access point, are reflected off of the at least one intelligent reflecting surface to the station device with the predetermined phases.

In some aspects, the techniques described herein relate to an apparatus, wherein the one or more processors are configured to determine the predetermined phases by determining a series of orthogonal phase vectors.

In some aspects, the techniques described herein relate to an apparatus, wherein the one or more processors are configured to determine the series of orthogonal phase vectors by determining the series of orthogonal phase vectors using a Gram-Schmidt Orthonormalization algorithm.

In some aspects, the techniques described herein relate to an apparatus, further including one or more network interfaces, wherein the one or more processors are configured to control the at least one intelligent reflecting surface such that the wireless signals reflected off of the at least one intelligent reflecting surface transition from one phase of the predetermined phases to a next phase of the predetermined phases in response to detecting a block-acknowledgment request message via the one or more network interfaces.

In some aspects, the techniques described herein relate to an apparatus, wherein the one or more processors are configured to control the at least one intelligent reflecting surface in response to the wireless access point entering an off-channel scanning operation.

In some aspects, the techniques described herein relate to an apparatus, wherein the one or more processors are configured to control the at least one intelligent reflecting surface by controlling the at least one intelligent reflecting surface such that the at least one intelligent reflecting surface provides the series of the wireless signals with the predetermined phases at a predetermined interval.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   determining a series of predetermined phases for wireless signals to be used in location calculations to be performed by a station device accessing a wireless access point, wherein the determining comprises determining a series of orthogonal phase vectors;
   reflecting wireless signals from the wireless access point off of an intelligent reflecting surface to the station device; and
   controlling the intelligent reflecting surface such that a series of the wireless signals are reflected off of the intelligent reflecting surface with the predetermined phases for the location calculations to be performed by the station device,
   wherein each orthogonal phase vector of the series of orthogonal phase vectors corresponds to one state at which the intelligent reflecting surface is controlled.

2. The method of claim 1, wherein determining the series of orthogonal phase vectors comprises determining the series of orthogonal phase vectors using a Gram-Schmidt Orthonormalization algorithm.

3. The method of claim 1, wherein the intelligent reflecting surface is controlled to cause the wireless signals reflected off of the intelligent reflecting surface to transition from one phase of the predetermined phases to a next phase of the predetermined phases in response to detecting a specific message transmitted between the wireless access point and the station device.

4. The method of claim 3, wherein the specific message comprises a block-acknowledgment request message.

5. The method of claim 1, wherein controlling the intelligent reflecting surface comprises controlling the intelligent reflecting surface in response to the wireless access point entering an off-channel scanning operation.

6. The method of claim 1, wherein controlling the intelligent reflecting surface comprises controlling the intelligent reflecting surface based on channel state information for communications between the wireless access point and the station device.

7. The method of claim 6, wherein controlling the intelligent reflecting surface based on the channel state information comprises controlling the intelligent reflecting surface to eliminate reflected paths from the wireless signals obtained by the station device.

8. The method of claim 7, wherein controlling the intelligent reflecting surface based on the channel state information comprises controlling the intelligent reflecting surface to eliminate reflected paths from the wireless signals obtained by the station device includes controlling the intelligent reflecting surface to direct wireless signals incident on the intelligent reflecting surface away from the station device.

9. The method of claim 1, wherein controlling the intelligent reflecting surface comprises controlling the intelligent reflecting surface such that the intelligent reflecting surface provides the series of the wireless signals with the predetermined phases at a predetermined interval.

10. The method of claim 9, wherein the predetermined interval is based upon a beacon interval of the wireless access point.

11. A method comprising:
obtaining, at a station device, a first wireless signal provided from a wireless access point along a path that includes an intelligent reflecting surface;
obtaining, at the station device, a second wireless signal provided from the wireless access point along the path that includes the intelligent reflecting surface, wherein the second wireless signal is phase shifted relative to the first wireless signal by the intelligent reflecting surface according to a series of predetermined orthogonal phase vectors,
wherein each predetermined orthogonal phase vector of the series of predetermined orthogonal phase vectors corresponds to one state at which the intelligent reflecting surface is controlled; and
determining, by the station device, a location of the station device relative to the wireless access point based upon the first wireless signal and the second wireless signal.

12. The method of claim 11, wherein the first wireless signal is obtained during a first off-channel scanning operation of the wireless access point and the second wireless signal is obtained during a second off-channel scanning operation of the wireless access point.

13. The method of claim 11, wherein obtaining the second wireless signal comprises obtaining the second wireless signal in response to a block-acknowledgment request message provided from the station device to the wireless access point.

14. The method of claim 13, wherein the second wireless signal comprises a block acknowledgment message provided by the wireless access point in response to the block-acknowledgment request message.

15. An apparatus comprising:
at least one intelligent reflecting surface; and
one or more processors, wherein the one or more processors are configured to:
determine a series of predetermined phases for wireless signals to be used in location calculations to be performed by a station device accessing a wireless access point, wherein the determining comprises determining a series of orthogonal phase vectors; and
control the at least one intelligent reflecting surface such that a series of wireless signals, incident from a wireless access point, are reflected off of the at least one intelligent reflecting surface to the station device with the predetermined phases for the location calculations to be performed by the station device, wherein each orthogonal phase vector of the series of orthogonal phase vectors corresponds to one state at which the at least one intelligent reflecting surface is controlled.

16. The apparatus of claim 15, wherein the one or more processors are configured to determine the series of orthogonal phase vectors by determining the series of orthogonal phase vectors using a Gram-Schmidt Orthonormalization algorithm.

17. The apparatus of claim 15, further comprising one or more network interfaces, wherein the one or more processors are configured to control the at least one intelligent reflecting surface to cause the wireless signals reflected off of the at least one intelligent reflecting surface to transition from one phase of the predetermined phases to a next phase of the predetermined phases in response to detecting a block-acknowledgment request message via the one or more network interfaces.

18. The apparatus of claim 15, wherein the one or more processors are configured to control the at least one intelligent reflecting surface in response to the wireless access point entering an off-channel scanning operation.

19. The apparatus of claim 15, wherein the one or more processors are configured to control the at least one intelligent reflecting surface by controlling the at least one intelligent reflecting surface based on channel state information for communications between the wireless access point and the station device.

20. The apparatus of claim 19, wherein to control the at least one intelligent reflecting surface based on the channel state information comprises controlling the at least one intelligent reflecting surface to eliminate reflected paths from the wireless signals obtained by the station device.

* * * * *